US012189335B2

(12) United States Patent
Yawada et al.

(10) Patent No.: US 12,189,335 B2
(45) Date of Patent: Jan. 7, 2025

(54) WHITE TONER, ELECTROSTATIC CHARGE IMAGE DEVELOPER, AND TONER CARTRIDGE

(71) Applicant: FUJIFILM Business Innovation Corp., Tokyo (JP)

(72) Inventors: Teppei Yawada, Kanagawa (JP); Asafumi Fujita, Kanagawa (JP); Kotaro Yoshihara, Kanagawa (JP); Tsuyoshi Murakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 524 days.

(21) Appl. No.: 17/665,577

(22) Filed: Feb. 6, 2022

(65) Prior Publication Data

US 2023/0092262 A1 Mar. 23, 2023

(30) Foreign Application Priority Data

Sep. 21, 2021 (JP) ................................ 2021-153563

(51) Int. Cl.

| | |
|---|---|
| ***G03G 9/08*** | (2006.01) |
| ***G03G 9/097*** | (2006.01) |
| ***G03G 15/08*** | (2006.01) |

(52) U.S. Cl.

CPC ......... *G03G 9/0825* (2013.01); *G03G 9/0819* (2013.01); *G03G 9/09708* (2013.01); *G03G 9/09733* (2013.01); *G03G 15/0865* (2013.01)

(58) Field of Classification Search

CPC ............... G03G 9/0825; G03G 9/0819; G03G 9/09708; G03G 9/09733; G03G 15/0865; G03G 9/08782

See application file for complete search history.

(56) References Cited

U.S. PATENT DOCUMENTS

| | | | |
|---|---|---|---|
| 8,465,895 B2 | 6/2013 | Ikeda et al. | |
| 2017/0242366 A1 | 8/2017 | Kamiwaki et al. | |
| 2018/0088481 A1* | 3/2018 | Kayamori ............ | G03G 9/0926 |

FOREIGN PATENT DOCUMENTS

| | | |
|---|---|---|
| JP | 2012128008 | 7/2012 |
| JP | 2017146497 | 8/2017 |
| JP | 2018018035 | 2/2018 |

* cited by examiner

*Primary Examiner* — Stewart A Fraser
(74) *Attorney, Agent, or Firm* — JCIPRNET

(57) ABSTRACT

A white toner includes a toner particle that contains a binder resin, a release agent, and titanium oxide, at least a part of the titanium oxide being present in a release agent domain, in which in observation of a cross section of the toner particle, an average major axis length Dt of the toner particle, an average major axis length Dw of the release agent domain, and an average major axis length Dp of the titanium oxide in the release agent domain satisfy Expressions (1) and (2).

$$2\times Dp \leq Dw \leq 10\times Dp \quad \text{Expression (1):}$$

$$0.1\times Dt \leq Dw \leq 0.5\times Dt \quad \text{Expression (2).}$$

11 Claims, 2 Drawing Sheets

WHITE TONER, ELECTROSTATIC CHARGE IMAGE DEVELOPER, AND TONER CARTRIDGE

CROSS-REFERENCE TO RELATED APPLICATIONS

This application is based on and claims priority under 35 USC 119 from Japanese Patent Application No. 2021-153563 filed Sep. 21, 2021.

BACKGROUND

(i) Technical Field

The present disclosure relates to a white toner, an electrostatic charge image developer, and a toner cartridge.

(ii) Related Art

JP2012-128008A discloses a toner that contains a binder resin and at least two different kinds of white pigments, in which 10% to 30% by weight of the white pigments are porous titanium oxide having a volume average particle diameter of 0.01 to 1 μm, a particle size distribution of 1.1 to 1.3, and a BET specific surface area of 250 to 500 $m^2/g$.

JP2017-146497A discloses a white toner that contains white toner particles and yellow toner particles containing an organic yellow pigment, in which the content of the yellow toner particles in the entirety of the toner particles is 0.01% by number or greater and 3% by number or less.

JP2018-018035A discloses a white toner that contains toner particles containing a binder resin, a release agent, and a white pigment, in which the content of the white pigment is 30% by mass or greater with respect to the entirety of the toner particles, and in a case where the volume average particle diameter of the toner particles is defined as d, the release agent is present in an amount of 50% by mass or greater and 90% by mass or less with respect to the total mass of the release agent in the toner particles in a portion where the distance from the surface of each toner particle is 0.075d or less, and the average maximum ferret diameter of the release agent domain in the toner particles is 0.05 d or greater and 0.15 d or less.

SUMMARY

Aspects of non-limiting embodiments of the present disclosure relate to a white toner, an electrostatic charge image developer, and a toner cartridge that are unlikely generate a choking phenomenon as compared with a white toner in which an average major axis length Dt of toner particles, an average major axis length Dw of a release agent domain, and an average major axis length Dp of titanium oxide in the release agent domain do not satisfy Expression (1) or Expression (2). Here, Expression (1) is "$2\times Dp\leq Dw\leq 10\times Dp$" and Expression (2) is "$0.1\times Dt\leq Dw\leq 0.5\times Dt$".

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for achieving the above-described object includes the following aspects.

According to an aspect of the present disclosure, there is provided a white toner including a toner particle that contains a binder resin, a release agent, and titanium oxide, at least a part of the titanium oxide being present in a release agent domain, in which in observation of a cross section of the toner particle, an average major axis length Dt of the toner particle, an average major axis length Dw of the release agent domain, and an average major axis length Dp of the titanium oxide in the release agent domain satisfy Expressions (1) and (2).

$$2\times Dp\leq Dw\leq 10\times Dp \quad \text{Expression (1):}$$

$$0.1\times Dt\leq Dw\leq 0.5\times Dt \quad \text{Expression (2)}$$

BRIEF DESCRIPTION OF THE DRAWINGS

Exemplary embodiment(s) of the present invention will be described in detail based on the following figures, wherein.

DETAILED DESCRIPTION

Figure 1:
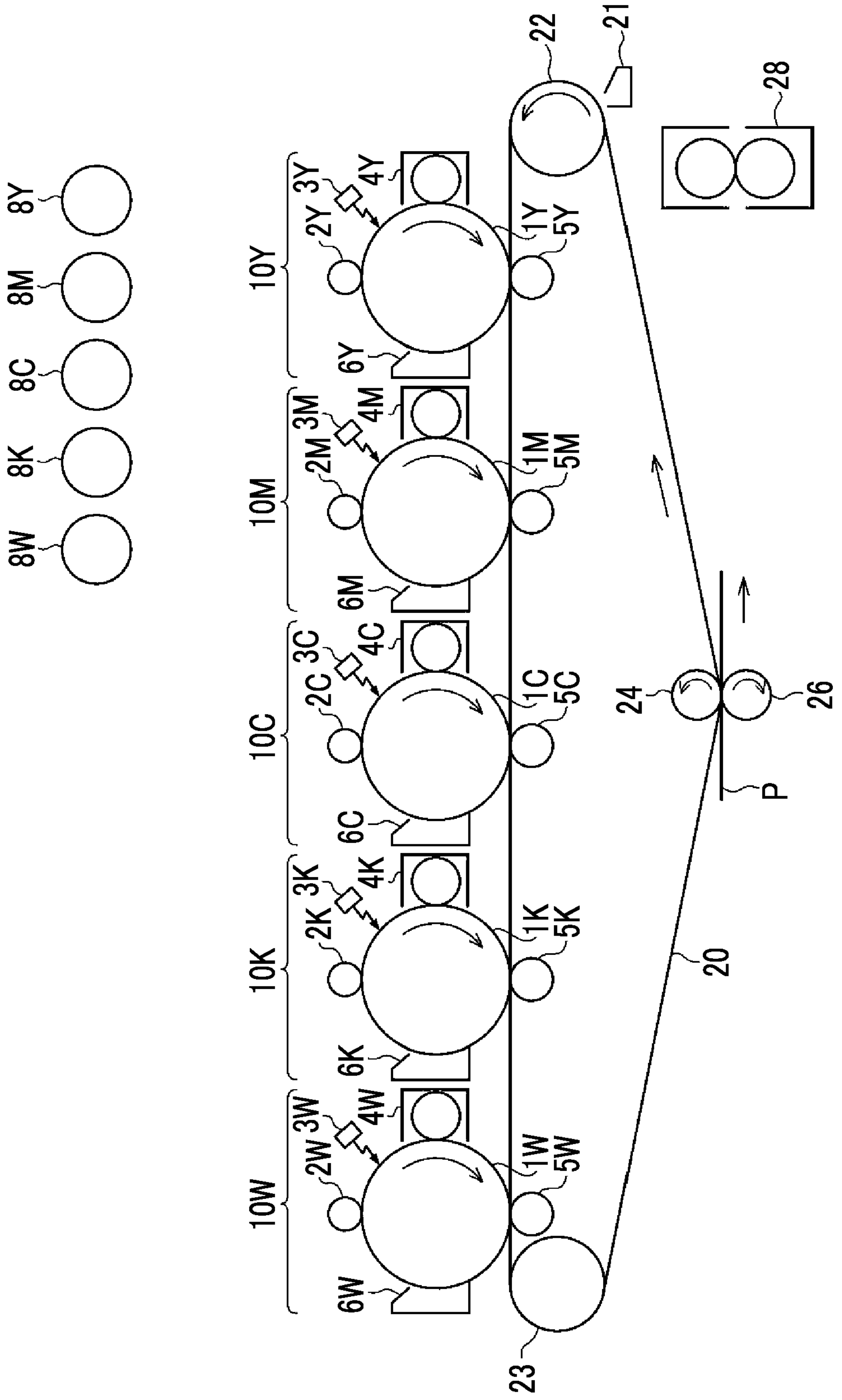
FIG. 1 is a schematic configuration view showing an example of an image forming device according to the present exemplary embodiment.

Hereinafter, exemplary embodiments of the present disclosure will be described. The following descriptions and examples merely illustrate the exemplary embodiments, and do not limit the scope of the exemplary embodiments.

In the present specification, a numerical range shown using "to" indicates a range including numerical values described before and after "to" as a minimum value and a maximum value.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present specification, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term "(meth)acrylic" indicates both acryl and methacryl, and the term "(meth)acrylate" indicates both acrylate and methacrylate.

In the present disclosure, the "electrostatic charge image developing toner" is also referred to as the "toner", the "electrostatic charge image developer" is also referred to as the "developer", and the "electrostatic charge image developing carrier" is also referred to as the "carrier".

White Toner

The white toner according to the present exemplary embodiment contains toner particles containing a binder resin, a release agent, and titanium oxide and also contains toner particles in which at least a part of titanium oxide is in the release agent domain.

In the white toner according to the present exemplary embodiment, in which in observation of a cross section of the toner particle, an average major axis length Dt of the toner particle, an average major axis length Dw of the release agent domain, and an average major axis length Dp of the titanium oxide in the release agent domain satisfy Expressions (1) and (2).

$$2\times Dp \leq Dw \leq 10\times Dp \quad \text{Expression (1):}$$

$$0.1\times Dt \leq Dw \leq 0.5\times Dt \quad \text{Expression (2):}$$

The image formed by the white toner according to the present exemplary embodiment is unlikely to generate a choking phenomenon. The mechanism is assumed as follows.

Titanium oxide is widely used as a white pigment of a toner. As means for increasing the whiteness and the concealability of a white image, means for increasing the amount of titanium oxide contained in the toner particles may be used. However, since titanium oxide has photocatalytic activity, a choking phenomenon (decrease in image intensity, cracks of an image, peeling of an image, fading, and the like) occurs in a case where a white image is exposed to light (particularly ultraviolet rays) for a long time. The choking phenomenon is significant as the amount of titanium oxide contained in the toner particles increases.

The present inventors found that in regard to the above-described phenomenon, the choking phenomenon can be suppressed while the releasability, the whiteness, and the concealability of a white image are improved by allowing at least a part of titanium oxide in the toner particles to be included in the release agent domain and specifying Expressions (1) and (2) for each dimension of the toner particles, the release agent domain, and titanium oxide in the release agent domain.

In the relationship between the average major axis length Dw of the release agent domain and the average major axis length Dp of titanium oxide in the release agent domain, Equation (1) specifies that Dw is 2 times or greater and 10 times or less of Dp.

In a case where Dw is two times or greater of Dp, titanium oxide in a white image may be present in the form of being applied to the release agent, contact between titanium oxide and the binder resin is suppressed, and decomposition of the binder resin due to the photocatalytic activity of titanium oxide is suppressed, and thus the choking phenomenon is assumed to be suppressed. In a case where Dw is less than two times Dp, the coating of titanium oxide with the release agent is insufficient in the white image, and the choking phenomenon is likely to occur.

On the other hand, in a case where Dw is greater than 10 times Dp, the whiteness and the concealability of the white image are insufficient.

From the above-described viewpoint, for example, Expression (1-1) is preferable, and Expression (1-2) is more preferable as Expression (1).

$$2.5\times Dp \leq Dw \leq 8\times Dp \quad \text{Expression (1-1):}$$

$$3\times Dp \leq Dw \leq 7\times Dp \quad \text{Expression (1-2):}$$

In the relationship between the average major axis length Dt of the toner particles and the average major axis length Dw of the release agent domain, Expression (2) specifies that Dw is 0.1 times or greater and 0.5 times or less of Dt, that is, Dw is 1/10 or greater and 1/2 or less of Dt.

In a case where Dw is less than 1/10 of Dt, the releasability of the white image with respect to the fixing member deteriorates during fixation of the white image to the recording medium. As a result, the surface of the white image is roughened and the choking phenomenon is likely to occur.

Meanwhile, in a case where Dw is greater than 1/2 of Dt, the intensity of the white image is insufficient and the choking phenomenon is likely to occur.

From the above-described viewpoint, for example, Expression (2-1) is preferable, and Expression (2-2) is more preferable as Expression (2).

$$0.125\times Dt \leq Dw \leq 0.4\times Dt \quad \text{Expression (2-1):}$$

$$0.15\times Dt \leq Dw \leq 0.35\times Dt \quad \text{Expression (2-2):}$$

In the white toner according to the present exemplary embodiment, from the viewpoint of forming an image that is unlikely to generate the choking phenomenon, for example, the average major axis length Dt of the toner particles, the average major axis length Dw of the release agent domain, and the average major axis length Dp of titanium oxide in the release agent domain satisfy preferably Expression (1-1) and Expression (2-1) and more preferably Expression (1-2) and Expression (2-2) in observation of a cross section of the toner particle.

In the white toner according to the present exemplary embodiment, from the viewpoint of forming an image that is unlikely to generate the choking phenomenon, for example, the number percentage of the titanium oxide in the release agent domain is preferably 50% by number or greater, more preferably 60% by number or greater, and still more preferably 80% by number or greater with respect to the entirety of the titanium oxide contained in the toner particle in observation of a cross section of the toner particle. The upper limit of the above-described number percentage (in the present disclosure, referred to as an inclusion ratio of titanium oxide) is 100% by number.

In the white toner according to the present exemplary embodiment, for example, in observation of a cross section of the toner particles, it is preferable that the average major axis length Dp of titanium oxide in the release agent domain is in the following range.

From the viewpoint of suppressing aggregation of titanium oxide and increasing the number of titanium oxides included in the release agent domain, Dp is, for example, preferably 100 nm or greater, more preferably 150 nm or greater, still more preferably 180 nm or greater.

From the viewpoint of ease of inclusion of titanium oxide in the release agent domain, Dp is, for example, preferably 300 nm or less, more preferably 250 nm or less, and still more preferably 220 nm or less.

In the white toner according to the present exemplary embodiment, for example, it is preferable that the average major axis length Dw of the release agent domain is in the following range in observation of a cross section of the toner particle.

From the viewpoint of ease of inclusion of titanium oxide, Dw is, for example, preferably 600 nm or greater, more preferably 800 nm or greater, and still more preferably 1000 nm or greater.

From the viewpoint of ensuring the intensity of the white image, Dw is, for example, preferably 3000 nm or less, more preferably 2500 nm or less, and still more preferably 2000 nm or less.

In the white toner according to the present exemplary embodiment, for example, it is preferable that the average major axis length Dt of the toner particles is in the following range in observation of a cross section of the toner particle.

From the viewpoint of ease of toner particle granulation, Dt is, for example, preferably 3.5 μm or greater, more preferably 4.0 μm or greater, and still more preferably 4.5 μm or greater.

From the viewpoint of forming a fine white image, Dt is, for example, preferably 10 μm or less, more preferably 9.0 μm or less, and still more preferably 8.0 μm or less.

Hereinafter, a method of observing a cross section of the toner particle and a method of measuring geometrical quantities will be described.

The toner particles (an external additive may be attached thereto) are embedded with a bisphenol A type liquid epoxy resin and a curing agent to prepare a cutting sample. A cutting sample is cut at a temperature of lower than −100° C. using a cutting device (for example, LEICA Ultra Microtome, manufactured by Hitachi High-Tech Corporation) equipped with a diamond knife to prepare an observation sample. The observation sample is allowed to stand in a desiccator under a ruthenium tetroxide atmosphere and dyed as necessary.

The observation sample is observed with a scanning transmission electron microscope (STEM), and a STEM image is recorded at a magnification that allows the cross section of one toner particle to be in the field of view. The recorded STEM image is analyzed under a condition of 0.010 μm/pixel using image analysis software (for example, WinROOF2015, Mitani Corporation).

The cross-sectional shape of the toner particles is determined based on a difference in brightness (contrast) between an epoxy resin for embedding and a binder resin of the toner particles. In the STEM image, since titanium oxide appears black due to the difference in brightness (contrast) between the binder resin and the release agent and titanium oxide, the black particles in the cross section of the toner particle are titanium oxide.

Since the STEM image has cross sections of the toner particles with various sizes, cross sections of the toner particles in which the major axis length is 80% or greater of the volume average particle diameter of the toner particles are selected, and cross sections of 200 toner particles are randomly selected from the selected cross sections and observed.

The reason for selecting cross sections in which the major axis length is 80% or greater of the volume average particle diameter of the toner particles is that cross sections in which the major axis length is less than 80% of the volume average particle diameter is expected to be cross sections of the end portions of the toner particles, and thus the state of the domain in the toner particles is not sufficiently reflected on the cross section of the end portion of the toner particle.

In the present disclosure, the major axis length is the length of the longest straight line among all the straight lines connecting two points on the contour line.

The average major axis length Dt of the toner particles is an arithmetic average value of the major axis lengths of 200 toner particles.

The average major axis length Dw of the release agent domain is the arithmetic average of the major axis lengths of release agent domains in a case where all the release agent domains contained in 200 toner particles are set as the measurement targets (that is, the release agent domains are measurement targets regardless of whether the release agent domains contain titanium oxide therein).

The average major axis length Dp of titanium oxide in the release agent domain is the arithmetic average of the major axis lengths of titanium oxides in a case where all the titanium oxides contained in the release agent domains of 200 toner particles are set as the measurement targets (that is, the titanium oxides that are in the release agent domains and are not in contact with the contour of the release agent domains).

The inclusion ratio of titanium oxide is the population of all the titanium oxides contained in 200 toner particles, and the titanium oxides (that is, the titanium oxides that are in the release agent domains and are not in contact with the contour of the release agent domains) contained in the release agent domains are denoted in units of % by number.

In the white toner according to the present exemplary embodiment, from the viewpoint of balancing the releasability, the whiteness, and the concealability of a white image and suppressing the choking phenomenon, the mass ratio of the release agent to titanium oxide (release agent/titanium oxide) contained in the toner particles is, for example, preferably 0.01 or greater and 0.3 or less, more preferably 0.015 or greater and 0.25 or less, and still more preferably 0.02 or greater and 0.2 or less.

Hereinafter, the toner according to the present exemplary embodiment will be described in detail.

The toner according to the present exemplary embodiment contains toner particles and, as necessary, an external additive.

Toner Particles

The toner particles contain a binder resin, a release agent, and titanium oxide, and as necessary, other additives.

Binder Resin

Examples of the binder resin include vinyl-based resins consisting of homopolymers of monomers such as styrenes (for example, styrene, parachlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacronitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene) or copolymers obtained by combining two or more kinds of such monomers.

Other examples of the binder resin include non-vinyl-based resins such as an epoxy resin, a polyester resin, a polyurethane resin, a polyamide resin, a cellulose resin, a polyether resin, and modified rosin, mixtures of such resins with the above-described vinyl-based resins, and graft polymers obtained by polymerizing vinyl-based monomers in the coexistence of such resins.

The binder resins may be used alone or in combination of two or more kinds thereof.

As the binder resin, for example, a polyester resin is preferable.

Examples of the polyester resin include known amorphous polyester resins. As the polyester resin, a combination of an amorphous polyester resin and a crystalline polyester resin may be used. The content of the crystalline polyester resin is, for example, in a range of 2% by mass or greater and 40% by mass or less (preferably 2% by mass or greater and 20% by mass or less) with respect to all the binder resins.

The "crystallinity" of a resin indicates that a clear endothermic peak is present in differential scanning calorimetry (DSC) rather than a stepwise change in endothermic amount and specifically indicates that the half-width of the endothermic peak during measurement at a temperature rising rate of 10° C./min is within 10° C.

The "amorphous" resin indicates that the half-width is higher than 10° C., a stepwise change in endothermic amount is shown, or a clear endothermic peak is not recognized.

Amorphous Polyester Resin

Examples of the amorphous polyester resin include a condensed polymer of a polyvalent carboxylic acid and a polyhydric alcohol. As the amorphous polyester resin, a commercially available product or a synthesized product may be used.

Examples of the polyvalent carboxylic acid include an aliphatic dicarboxylic acid (for example, oxalic acid, malonic acid, maleic acid, fumaric acid, citraconic acid, itaconic acid, glutaconic acid, succinic acid, alkenyl succinic acid, adipic acid, or sebacic acid), an alicyclic dicarboxylic acid (for example, cyclohexanedicarboxylic acid), an aromatic dicarboxylic acid (for example, terephthalic acid, isophthalic acid, phthalic acid, or naphthalenedicarboxylic acid), an anhydride thereof, and lower (for example, having 1 or more and 5 or less carbon atoms) alkyl ester thereof. Among the examples, for example, an aromatic dicarboxylic acid is preferable as the polyvalent carboxylic acid.

As the polyvalent carboxylic acid, a combination of a dicarboxylic acid with a trivalent or higher valent carboxylic acid having a crosslinked structure or a branched structure may be used. Examples of the trivalent or higher valent carboxylic acid include trimellitic acid, pyromellitic acid, an anhydride thereof, and lower (for example, having 1 or more and 5 or less carbon atoms) alkyl ester thereof.

The polyvalent carboxylic acid may be used alone or in combination of two or more kinds thereof.

Examples of the polyhydric alcohol include an aliphatic diol (such as ethylene glycol, diethylene glycol, triethylene glycol, propylene glycol, butanediol, hexanediol, or neopentyl glycol), an alicyclic diol (such as cyclohexanediol, cyclohexanedimethanol, or hydrogenated bisphenol A) and an aromatic diol (such as an ethylene oxide adduct of bisphenol A or a propylene oxide adduct of bisphenol A). Among the examples, as the polyhydric alcohol, for example, an aromatic diol or an alicyclic diol is preferable, and an aromatic diol is more preferable.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolpropane, and pentaerythritol.

The polyhydric alcohol may be used alone or in combination of two or more kinds thereof.

The glass transition temperature (Tg) of the amorphous polyester resin is, for example, preferably 50° C. or higher and 80° C. or lower and more preferably 50° C. or higher and 65° C. or lower. Further, the glass transition temperature is acquired from the DSC curve obtained by differential scanning calorimetry (DSC) and more specifically acquired by the "extrapolated glass transition start temperature" described in the method of acquiring the glass transition temperature in JIS K 7121-1987 "Method of measuring transition temperature of plastics".

The weight-average molecular weight (Mw) of the amorphous polyester resin is, for example, preferably 5000 or greater and 1000000 or less and more preferably 7000 or greater and 500000 or less.

The number average molecular weight (Mn) of the amorphous polyester resin is, for example, preferably 2000 or greater and 100000 or less.

The molecular weight distribution Mw/Mn of the amorphous polyester resin is, for example, preferably 1.5 or greater and 100 or less and more preferably 2 or greater and 60 or less. Further, the weight-average molecular weight and the number average molecular weight are measured by gel permeation chromatography (GPC). The molecular weight is measured by GPC using GPC/HLC-8120 GPC (manufactured by Tosoh Corporation) as a measuring device, TSKgel SuperHM-M (15 cm) (manufactured by Tosoh Corporation) as a column, and a THF solvent. The weight-average molecular weight and the number average molecular weight are calculated using a molecular weight calibration curve created by a monodisperse polystyrene standard sample based on the measurement results.

Crystalline Polyester Resin

Examples of the crystalline polyester resin include a polycondensate of a polyvalent carboxylic acid and a polyhydric alcohol. As the crystalline polyester resin, a commercially available product or a synthesized product may be used. Since the crystalline polyester resin easily forms a crystal structure, for example, a polycondensate obtained by using a linear aliphatic polymerizable monomer is preferable to a polymerizable monomer having an aromatic ring.

Examples of the polyvalent carboxylic acid include an aliphatic dicarboxylic acid (for example, oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, or 1,18-octadecanedicarboxylic acid), an aromatic dicarboxylic acid (for example, a dibasic acid such as phthalic acid, isophthalic acid, terephthalic acid, or naphthalene-2,6-dicarboxylic acid), an anhydride thereof, and lower (for example, having 1 or more and 5 or less carbon atoms) alkyl ester thereof.

As the polyvalent carboxylic acid, a combination of a dicarboxylic acid with a trivalent or higher valent carboxylic acid having a crosslinked structure or a branched structure may be used. Examples of the trivalent carboxylic acid include an aromatic carboxylic acid (for example, 1,2,3-benzenetricarboxylic acid, 1,2,4-benzenetricarboxylic acid, or 1,2,4-naphthalenetricarboxylic acid), an anhydride thereof, and lower (for example, having 1 or more and 5 or less carbon atoms) alkyl ester thereof.

As the polyvalent carboxylic acid, a combination of such dicarboxylic acids with a dicarboxylic acid containing a sulfonic acid group and a dicarboxylic acid having an ethylenic double bond may be used.

The polyvalent carboxylic acid may be used alone or in combination of two or more kinds thereof.

Examples of the polyhydric alcohol include an aliphatic diol (for example, a linear aliphatic diol having a main chain portion with 7 or more and 20 or less carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the examples, for example, 1,8-octanediol, 1,9-nonanediol, or 1,10-decanediol is preferable as the aliphatic diol.

As the polyhydric alcohol, a combination of a diol with a trihydric or higher polyhydric alcohol having a crosslinked structure or a branched structure may be used. Examples of the trihydric or higher polyhydric alcohol include glycerin, trimethylolethane, trimethylolpropane, and pentaerythritol.

The polyhydric alcohol may be used alone or in combination of two or more kinds thereof.

Here, as the polyhydric alcohol, for example, the content of the aliphatic diol may be set to 80% by mole or greater and preferably 90% by mole or greater.

The melting temperature of the crystalline polyester resin is, for example, preferably 50° C. or higher and 100° C. or lower, more preferably 55° C. or higher and 90° C. or lower, and still more preferably 60° C. or higher and 85° C. or lower. Further, the melting temperature is acquired from the DSC curve obtained by differential scanning calorimetry (DSC) according to the "melting peak temperature" described in the method of acquiring the melting temperature in JIS K7121-1987 "Method of measuring transition temperature of plastics".

The weight-average molecular weight (Mw) of the crystalline polyester resin is, for example, preferably 6,000 or greater and 35,000 or less.

The content of the binder resin is, for example, preferably 40% by mass or greater and 70% by mass or less, more preferably 50% by mass or greater and 65% by mass or less, and still more preferably 50% by mass or greater and 60% by mass or less with respect to the entirety of the toner particles.

Release Agent

Examples of the release agent include hydrocarbon-based wax, natural wax such as carnauba wax, rice wax, or candelilla wax, synthetic or mineral/petroleum wax such as montan wax, and ester based wax such as fatty acid ester or montanic acid ester. The release agent is not limited thereto.

From the viewpoint of high affinity for titanium oxide and ease of inclusion of titanium oxide, as the release agent, for example, ester wax is preferable, and fatty acid ester wax is more preferable.

The melting temperature of the release agent is, for example, preferably 50° C. or higher and 110° C. or lower and more preferably 60° C. or higher and 100° C. or lower. The melting temperature of the release agent is acquired from the DSC curve obtained by differential scanning calorimetry (DSC) in conformity with the "method of measuring transition temperature of plastics" and "melting peak temperature" in JIS K 7121:1987.

The content of the release agent is, for example, preferably 0.3% by mass or greater and 20% by mass or less, more preferably 0.5% by mass or greater and 15% by mass or less, and still more preferably 0.7% by mass or greater and 10% by mass or less with respect to the entirety of the toner particles.

Titanium Oxide

Titanium oxide ($TiO_2$) is a pigment that imparts whiteness to a toner and is a particulate material. The crystal structure of titanium oxide may be anatase, rutile, brookite, a mixed crystal structure thereof or an amorphous structure thereof.

Examples of a method of producing titanium oxide include a chlorine method (gas phase method), a sulfuric acid method (liquid phase method), a sol-gel method using titanium alkoxide, and a method of firing metatitanic acid.

An example of the chlorine method (gas phase method) is as follows. Rutile ore that is a raw material is allowed to react with coke and chlorine to form gaseous titanium tetrachloride and cooled, thereby obtaining liquid titanium tetrachloride. Next, gaseous or steamy titanium tetrachloride is allowed to react with oxygen gas at a high temperature to separate chlorine gas, thereby obtaining titanium oxide.

From the viewpoints of the dispersibility in the binder resin and the weather resistance of a white image, it is preferable that the titanium oxide is, for example, titanium oxide that is surface-treated with at least one of an inorganic compound or an organic compound.

From the viewpoints of the dispersibility in the binder resin and the weather resistance of a white image, the surface treatment method and the surface treatment agent for titanium oxide may be selected from known methods and known treatment agents. The surface treatment method for titanium oxide is largely classified into wet a treatment and a dry treatment.

The wet treatment is a treatment method of adding a surface treatment agent to a slurry in which titanium oxide is dispersed in an aqueous solvent or an organic solvent and coating the surface of titanium oxide.

The dry treatment is a treatment method of applying steam or gas of a surface treatment agent to flowing titanium oxide and coating the surface of the titanium oxide.

Examples of the surface treatment agent for titanium oxide include a metal oxide containing Al, a metal oxide containing Si, a metal oxide containing Zr, fatty acids, and silicone.

From the viewpoint of ease of inclusion in the release agent domain, for example, it is preferable that the titanium oxide is titanium oxide coated with alumina ($Al_2O_3$). The titanium oxide coated with alumina may have other chemicals (such as silica, zirconia, fatty acids, silicone) disposed between the alumina and the titanium oxide and, for example, it is preferable that the alumina is on the outermost surface. In the present disclosure, the "coating" indicates attachment to at least a part of the surface of an object.

From the viewpoint of ease of inclusion in the release agent domain, the average major axis length of the titanium oxide is, for example, preferably 100 nm or greater and 300 nm or less, more preferably 150 nm or greater and 250 or less, and still more preferably 180 nm or greater and 220 or less.

From the viewpoint of improving the dispersibility in the release agent, the BET specific surface area of the titanium oxide is, for example, preferably 4 $m^2/g$ or greater and more preferably 6 $m^2/g$ or greater.

From the viewpoint of excellent whiteness, the BET specific surface area of the titanium oxide is, for example, preferably 12 $m^2/g$ or less and more preferably 10 $m^2/g$ or less.

The BET specific surface area of titanium oxide is acquired by the following measuring method.

In a case where the white toner contains an external additive, the white toner is added to a 5 mass % sodium alkylbenzene sulfonate aqueous solution, and the solution is stirred. Next, ultrasonic waves are applied by a bathtub type ultrasonic disperser to release the external additive from the surface of the toner particle. Thereafter, the toner particles are precipitated by centrifugation, and the supernatant in which the external additive is released and dispersed is removed. The operation from the ultrasonic treatment to the removal of the supernatant is repeated 3 times. Next, the toner particles are suspended in toluene to dissolve the binder resin and the release agent, and the solution is filtered for solid-liquid separation. The solid is sufficiently cleaned with water and then dried, thereby obtaining powder. This powder is used as a measurement sample the BET specific surface area.

The BET specific surface area is a value measured by precisely weighing 1 g of the sample according to a BET multipoint method using nitrogen gas with a BET specific surface area meter (for example, SA3100, manufactured by Beckman Coulter KK).

The toner particles may contain white pigments other than the titanium oxide. Examples of other white pigments include zinc oxide, silicon dioxide, alumina, calcium carbonate, aluminum hydroxide, satin white, talc, calcium sulfate, magnesium oxide, magnesium carbonate, white carbon, kaolin, an aluminosilicate, sericite, bentonite, and smectite. Such white pigments may be used alone or in combination of two or more kinds thereof. Such white pigments may be added to the toner particles for applications other than coloration (for example, applications such as control of charging the toner).

The content of the titanium oxide contained in the toner particles is, for example, preferably 85% by mass or greater and 100% by mass or less, more preferably 90% by mass or greater and 100% by mass or less, and still more preferably 95% by mass or greater and 100% by mass or less with respect to the total amount of the white pigment contained in the toner particles.

From the viewpoints of whiteness and concealability, the content of the titanium oxide contained in the toner particles is, for example, preferably 30% by mass or greater and 70% by mass or less, more preferably 40% by mass or greater and 70% by mass or less, and still more preferably 50% by mass or greater and 70% by mass or less with respect to the entirety of the toner particles.

Other Additives

Examples of other additives include known additives such as a magnetic material, a charge control agent, and inorganic powder. Such additives are contained in the toner particles as internal additives.

Characteristics of Toner Particles and the Like

The toner particles may be toner particles having a single layer structure or toner particles having a so-called core-shell structure formed of a core portion (core particle) and a coating layer (shell layer) covering the core portion. The toner particles having a core-shell structure may be formed of, for example, a core portion containing a binder resin, a release agent, and titanium oxide and a coating layer containing the binder resin.

The volume average particle diameter (D50v) of the toner particles is, for example, preferably 2 μm or greater and 10 μm or less and more preferably 4 μm or greater and 8 μm or less.

Various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5 mass % aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. The number of particles to be sampled is 50000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter) [(perimeter of circle having same projected area as particle image)/(perimeter of projected particle image)]. Specifically, the average circularity is a value measured by the following method.

First, the average circularity is acquired by a flow type particle image analyzer (FPIA-3000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3500.

In a case where the toner has an external additive, the toner (developer) to be measured is dispersed in water containing a surfactant, and an ultrasonic treatment is performed, thereby obtaining toner particles from which the external additive has been removed.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3.2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. The hydrophobic treatment agent may be used alone or in combination of two or more kinds thereof.

The amount of the hydrophobic treatment agent is, for example, typically 1 part by mass or greater and 10 parts by mass or less with respect to 100 parts by mass of the inorganic particles.

Examples of external additives also include resin particles (resin particles such as polystyrene, polymethylmethacrylate, and melamine resins), a cleaning activator (for example, a metal salt of a higher fatty acid represented by zinc stearate or fluorine-based polymer particles), and the like.

The amount of the external additive to be externally added is, for example, preferably 0.01% by mass or greater and 5% by mass or less and more preferably 0.01% by mass or greater and 2.0% by mass or less with respect to the entirety of the toner particles.

Method of Producing White Toner

The white toner according to the present exemplary embodiment can be obtained by externally adding the external additive to the toner particles after the production of the toner particles.

The toner particles may be produced by any of a dry production method (for example, a kneading and pulverizing method) or a wet production method (for example, an aggregation and coalescence method, a suspension polymerization method, or a dissolution suspension method). The production method is not particularly limited, and a known production method is employed. Among the examples, the toner particles may be obtained by, for example, the aggregation and coalescence method.

In a case where the toner particles are produced by the aggregation and coalescence method, from the viewpoint of inclusion of titanium oxide in the release agent domain, for example, the following production method is preferable.

The production method includes the photoluminescent toner particles are produced by performing a step of preparing a resin particle dispersion liquid in which resin particles serving as a binder resin are dispersed (resin particle dispersion liquid preparation step), a step of preparing a titanium oxide-containing release agent particle dispersion liquid in which particles containing a release agent and titanium oxide are dispersed (titanium oxide-containing release agent particle dispersion liquid preparation step), a step of allowing mixed particles to be aggregated in a mixed dispersion liquid of the resin particle dispersion liquid and titanium oxide-containing release agent particle dispersion liquid to form aggregated particles (aggregated particle formation step), and a step of heating an aggregated particle dispersion liquid in which the aggregated particles are dispersed and fusing and coalescing the aggregated particles to form toner particles (fusion and coalescence step).

Resin Particle Dispersion Liquid Preparation Step

The resin particle dispersion liquid is prepared, for example, by allowing the resin particles to be dispersed in a dispersion medium using a surfactant.

Examples of the dispersion medium used in the resin particle dispersion liquid include an aqueous medium.

Examples of the aqueous medium include water such as distilled water or ion exchange water and alcohols. The aqueous medium may be used alone or in combination of two or more kinds thereof.

Examples of the surfactant include an anionic surfactant based on a sulfuric acid ester salt, a sulfonate, a phosphoric acid ester salt, soap, and the like; a cationic surfactant such as an amine salt type cationic surfactant and a quaternary ammonium salt type cationic surfactant; a nonionic surfactant based on polyethylene glycol, an alkylphenol ethylene oxide adduct, and a polyhydric alcohol, and the like. Among the examples, particularly, an anionic surfactant and a cationic surfactant may be exemplified. A nonionic surfactant may be used in combination with an anionic surfactant or a cationic surfactant.

The surfactant may be used alone or in combination of two or more kinds thereof.

Examples of the method of allowing the resin particles to be dispersed in the dispersion medium in the resin particle dispersion liquid include typical dispersion methods such as a rotary shear homogenizer, a ball mill having a medium, a sand mill, and a dyno mill. Depending on the kind of resin particles, the resin particles may be dispersed in a dispersion medium by a phase inversion emulsification method. The phase inversion emulsification method is a method of dissolving the resin to be dispersed in a hydrophobic organic solvent in which the resin is soluble, adding a base to an organic continuous phase (O phase) for neutralization, adding an aqueous medium (W phase thereto, performing phase inversion from W/O to O/W, and dispersing the resin in the aqueous medium in the particle form.

The volume average particle diameter of the resin particles to be dispersed in the resin particle dispersion liquid is, for example, preferably 0.01 μm or greater and 1 μm or less, more preferably 0.08 μm or greater and 0.8 μm or less, and still more preferably 0.1 μm or greater and 0.6 μm or less. The volume average particle diameter of the resin particles is obtained by drawing cumulative distribution of the volume from the small diameter side for each divided particle size range (channel) and measuring the particle diameter at a cumulative 50% as the volume average particle diameter D50v with respect to the entirety of the particles, using the particle size distribution obtained by performing measurement with a laser diffraction type particle size distribution measuring device (for example, LA-700, manufactured by Horiba, Ltd.). Further, the volume average particle diameter of the particles in another dispersion liquid is measured in the same manner as described above.

The content of the resin particles contained in the resin particle dispersion liquid is, for example, preferably 5% by mass or greater and 50% by mass or less and more preferably 10% by mass or greater and 40% by mass or less.

Step of Preparing Titanium Oxide-Containing Release Agent Particle Dispersion Liquid First, the release agent and titanium oxide are kneaded while being heated to obtain a kneaded product in which titanium oxide is mixed with the release agent. The kneaded product is cooled and solidified, and the solidified kneaded product is coarsely pulverized with a coarse pulverizer (for example, a hammer mill or a cutter mill), thereby obtaining a coarsely pulverized product. The coarsely pulverized product is pulverized with a pulverizer (for example, a jet mill) to obtain a pulverized product.

Next, the pulverized product, the aqueous medium, and the surfactant are mixed and subjected to a dispersion treatment with a disperser (for example, a pressure discharge type homogenizer or a rotary shear homogenizer) while being heated. The aqueous medium and the surfactant are respectively the same as the aqueous medium and the surfactant described above in the section of the resin particle dispersion liquid.

The volume average particle diameter of the particles dispersed in the titanium oxide-containing release agent particle dispersion is, for example, preferably 0.2 μm or greater and 1 μm or less.

The content of the particles contained in the titanium oxide-containing release agent particle dispersion liquid is, for example, preferably 5% by mass or greater and 50% by mass or less and more preferably 10% by mass or greater and 40% by mass or less.

Aggregated Particle Formation Step

Next, the resin particle dispersion liquid and the titanium oxide-containing release agent particle dispersion liquid are mixed with each other. Further, the resin particles and the titanium oxide-containing release agent particle dispersion liquids are heteroaggregated in the mixed dispersion liquid to form aggregated particles including the resin particles and the titanium oxide-containing release agent particles, which have a diameter close to the diameter of the target toner particles.

Specifically, for example, the aggregated particles are formed by adding an aggregating agent to the mixed dispersion liquid, adjusting the pH of the mixed dispersion liquid to be acidic (for example, a pH of 2 or greater and 5 or less), adding a dispersion stabilizer thereto as necessary, heating the solution to a temperature close to the glass transition temperature of the resin particles (specifically, for example, a temperature higher than or equal to the glass transition temperature of the resin particles—30° C. and lower than or equal to the glass transition temperature thereof—10° C.) and allowing the particles to be dispersed in the mixed dispersion liquid to be aggregated.

In the aggregated particle formation step, for example, the heating may be performed after the mixed dispersion liquid is stirred with a rotary shear homogenizer, the aggregating agent is added thereto at room temperature (for example, 25° C.), the pH of the mixed dispersion liquid is adjusted to be acidic (for example, a pH of 2 or greater and 5 or less), and the dispersion stabilizer is added thereto as necessary.

Examples of the aggregating agent include a surfactant having a polarity opposite to the polarity of the surfactant contained in the mixed dispersion liquid, an inorganic metal salt, and a divalent or higher valent metal complex. In a case where a metal complex is used as the aggregating agent, the amount of the surfactant to be used is reduced, and the charging characteristics are improved.

In addition to the aggregating agent, an additive that forms a complex or a bond similar to the complex with a metal ion of the aggregating agent may be used as necessary. A chelating agent is used as the additive.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent to be added is, for example, preferably 0.01 parts by mass or greater and 5.0 parts by mass or less and more preferably 0.1 parts by mass or greater and less than 3.0 parts by mass with respect to 100 parts by mass of the resin particles.

Fusion and Coalescence Step

The aggregated particle dispersion liquid in which the aggregated particles are dispersed is heated to, for example, a temperature higher than or equal to the glass transition temperature of the resin particles (for example, a temperature higher than the glass transition temperature of the resin particles by 10° C. to 30° C.) and the aggregated particles are fused and coalesced, thereby forming toner particles.

The toner particles are obtained by performing the above-described steps.

Further, the toner particles may be produced by performing a step of obtaining the aggregated particle dispersion liquid in which the aggregated particles are dispersed, further mixing the aggregated particle dispersion liquid with the resin particle dispersion liquid, and allowing the resin particles to be aggregated such that the resin particle dispersion liquid is further attached to the surface of each aggregated particle to form second aggregated particles and a step of heating the second aggregated particle dispersion liquid in which the second aggregated particles are dispersed and fusing and coalescing the second aggregated particle to form toner particles having a core-shell structure.

After completion of the fusion and coalescence step, toner particles in a dry state are obtained by performing a known cleaning step, a known solid-liquid separation step, and a known drying step on the toner particles in the dispersion liquid. From the viewpoint of the charging properties, for example, displacement cleaning may be sufficiently performed as the cleaning step using ion exchange water. From the viewpoint of the productivity, for example, suction filtration, pressure filtration, or the like may be performed as the solid-liquid separation step. From the viewpoint of the productivity, for example, freeze-drying, flush drying, fluidized drying, vibratory fluidized drying, or the like may be performed as the drying step.

The toner according to the present exemplary embodiment is produced, for example, by adding an external additive to the obtained toner particles in a dry state and mixing the external additive with the toner particles. The mixing may be performed, for example, using a V blender, a Henschel mixer, a Lodige mixer, or the like. Further, coarse particles of the toner may be removed as necessary using a vibratory sieving machine, a pneumatic sieving machine, or the like.

Electrostatic Charge Image Developer

An electrostatic charge image developer according to the present exemplary embodiment contains at least the white toner according to the present exemplary embodiment.

The electrostatic charge image developer according to the present exemplary embodiment may be a one-component developer which contains only the white toner according to the present exemplary embodiment or a two-component developer obtained by mixing the white toner and a carrier.

The carrier is not particularly limited, and examples thereof include known carriers. Examples of the carrier include a coated carrier obtained by coating the surface of a core material consisting of magnetic powder with a resin, a magnetic powder dispersion type carrier obtained by dispersing magnetic powder in a matrix resin so as to be blended, and a resin impregnation type carrier obtained by impregnating porous magnetic powder with a resin. Each of the magnetic powder dispersion type carrier and the resin impregnation type carrier may be a carrier obtained by coating the surface of a core material, which is particles configuring the carrier, with a resin.

Examples of the magnetic powder include magnetic metals such as iron, nickel, and cobalt and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed by having an organosiloxane bond, a product obtained by modifying the straight silicone resin, a fluororesin, polyester, polycarbonate, a phenol resin, and an epoxy resin. The coating resin and the matrix resin may contain other additives such as conductive particles. Examples of the conductive particles include metals such as gold, silver, and copper, and particles such as carbon black, titanium oxide, zinc oxide, tin oxide, barium sulfate, aluminum borate, and potassium titanate.

Examples of a method of coating the surface of the core material with a resin include a method of coating the surface with a solution for forming a coating layer obtained by dissolving the coating resin and various additives (used as necessary) in an appropriate solvent. The solvent is not particularly limited, and may be selected in consideration of the kind of the resin to be used, coating suitability, and the like. Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

The mixing ratio (mass ratio) of the toner to the carrier (toner:carrier) in the two-component developer is, for example, preferably in a range of 1:100 to 30:100 and more preferably in a range of 3:100 to 20:100.

Image Forming Device and Image Forming Method

The image forming device according to the present exemplary embodiment includes an image holding member, a charging unit that charges a surface of the image holding member, an electrostatic charge image forming unit that forms an electrostatic charge image on the surface of the charged image holding member, a developing unit that accommodates an electrostatic charge image developer and develops the electrostatic charge image formed on the surface of the image holding member as a toner image by the electrostatic charge image developer, a transfer unit that transfers the toner image formed on the surface of the image holding member to a surface of a recording medium, and a fixing unit that fixes the toner image transferred to the surface of the recording medium. Further, the electrostatic charge image developer according to the present exemplary embodiment is applied as the electrostatic charge image developer.

With the image forming device according to the present exemplary embodiment, an image forming method (the image forming method according to the present exemplary embodiment) including a charging step of charging a surface of the image holding member, an electrostatic charge image formation step of forming an electrostatic charge image on the surface of the charged image holding member, a developing step of developing the electrostatic charge image formed on the surface of the image holding member as a toner image by the electrostatic charge image developer according to the present exemplary embodiment, a transfer step of transferring the toner image formed on the surface of the image holding member to a surface of a recording medium, and a fixing step of fixing the toner image transferred to the surface of the recording medium is performed.

As the image forming device according to the present exemplary embodiment, a known image forming device such as a direct transfer type device that directly transfers a toner image formed on a surface of an image holding member to a recording medium, an intermediate transfer type device that primarily transfers a toner image formed on a surface of an image holding member to a surface of an intermediate transfer member and secondarily transfers the toner image transferred to the surface of the intermediate transfer member to a surface of a recording medium, a device that includes a cleaning unit cleaning a surface of an image holding member after transfer of a toner image and before charge of the image holding member, or a device that includes an electricity removing unit removing electricity by irradiating a surface of an image holding member with electricity removing light after transfer of a toner image and before charge of the image holding member is applied.

In a case where the image forming device according to the present exemplary embodiment is the intermediate transfer type device, for example, a configuration in which the transfer unit includes an intermediate transfer member having a surface onto which a toner image is transferred, a primary transfer unit primarily transferring the toner image formed on the surface of the image holding member to the surface of the intermediate transfer member, and a secondary transfer unit secondarily transferring the toner image transferred to the surface of the intermediate transfer member to the surface of the recording medium is applied.

In the image forming device according to the present exemplary embodiment, for example, the portion including the developing unit may have a cartridge structure (process cartridge) that is detachably attached to the image forming device. For example, a process cartridge including a developing unit that accommodates the electrostatic charge image developer according to the present exemplary embodiment is preferably used as the process cartridge.

The image forming device according to the present exemplary embodiment may be an image forming device that further uses at least one selected from a yellow toner, a magenta toner, a cyan toner, and a black toner in addition to the white toner according to the present exemplary embodiment.

Hereinafter, an example of the image forming device according to the present exemplary embodiment will be described, but the present exemplary embodiment is not limited thereto. In the description below, main parts shown in the figures will be described, but description of other parts will not be provided.

FIG. 1 is a schematic configuration view showing an image forming device according to the present exemplary embodiment and is a view showing an image forming device having a 5-series tandem system and an intermediate transfer system.

The image forming device shown in FIG. 1 includes first to fifth image forming units 10Y, 10M, 10C, 10K, and 10W (image forming units) having an electrophotographic system of outputting images of each color of yellow (Y), magenta (M), cyan (C), black (K), and white (W) based on color-separated image data. The image forming units (hereinafter, also simply referred to as "units") 10Y, 10M, 10C, 10K, and 10W are arranged in parallel at predetermined intervals in the horizontal direction. The units 10Y, 10M, 10C, 10K, and 10W may be process cartridges that are detachable from the image forming device.

Above the units 10Y, 10M, 10C, 10K, and 10W, an intermediate transfer belt 20 (an example of the intermediate transfer member) extends across each of the units. An intermediate transfer belt 20 is provided by winding around a drive roll 22, a support roll 23, and an opposing roll 24 that are in contact with the inner surface of the intermediate transfer belt 20 and is designed to travel in a direction from the first unit 10Y to the fifth unit 10W. An intermediate transfer member cleaning device (an example of the intermediate transfer member cleaning unit) 21 is provided to face the driving roll 22 on an image holding surface side of the intermediate transfer belt 20.

The intermediate transfer belt 20 is, for example, a laminate of a base material layer and a surface layer disposed on an outer peripheral surface of a base material layer. The base material layer contains, for example, a resin such as a polyimide resin, a polyamide resin, a polyamide-imide resin, a polyether ester resin, a polyarylate resin, or a polyester resin, and a conductive agent. The surface layer contains, for example, at least one of the above-described resins, a fluororesin, and a conductive agent. The thickness of the intermediate transfer belt 20 is, for example, 50 μm or greater and 100 μm or less.

Each of yellow toner, magenta toner, cyan toner, black toner, and white toner stored in toner cartridges 8Y, 8M, 8C, 8K, and 8W is supplied to each of developing devices (an example of developing units) 4Y, 4M, 4C, 4K, and 4W of the units 10Y, 10M, 10C, 10K, and 10W.

Since the first to fifth units 10Y, 10M, 10C, 10K, 10W have the identical configurations, operations, and functions, the first unit 10Y that forms a yellow image disposed on the upstream side in the traveling direction of the intermediate transfer belt will be described as a representative example.

The first unit 10Y includes a photoreceptor 1Y that functions as an image holding member. A charging roll (an example of the charging unit) 2Y that charges the surface of the photoreceptor 1Y at a predetermined potential, an exposure device (an example of the electrostatic charge image forming unit) 3Y that exposes the charged surface to a laser beam 3Y based on a color-separated image signal to form an electrostatic charge image, a developing device (an example of a developing unit) 4Y that supplies the charged toner to the electrostatic charge image to develop the electrostatic charge image, a primary transfer roll (an example of the primary transfer unit) 5Y that transfers the developed toner image onto the intermediate transfer belt 20, and a photoreceptor cleaning device (an example of the image holding member cleaning unit) 6Y that removes the toner remaining on the surface of the photoreceptor 1Y after the primary transfer are arranged in this order in the periphery of the photoreceptor 1Y.

The primary transfer roll 5Y is disposed inside the intermediate transfer belt 20 and provided at a position facing the photoreceptor 1Y. Each bias power supply (not shown) that applies a primary transfer bias is connected to each of the primary transfer rolls 5Y, 5M, 5C, 5K, and 5W of the units. Each bias power supply changes the value of the transfer bias applied to each primary transfer roll by the control of a control unit (not shown).

Hereinafter, an operation of forming a yellow image in the first unit 10Y will be described.

First, prior to the operation, the surface of the photoreceptor 1Y is charged at a potential of −600 V to −800 V by the charging roll 2Y.

The photoreceptor 1Y is formed by laminating a photosensitive layer on a conductive substrate (for example, a volume resistivity of $1\times10^{-6}$ Ωcm or less at 20° C.). This photosensitive layer usually has a high resistance (the resistance of a typical resin), but has a property that in a case where the photosensitive layer is irradiated with a laser beam, the specific resistance of the portion irradiated with the laser beam changes. Therefore, the exposure device 3Y irradiates the surface of the charged photoreceptor 1Y with the laser beam based on yellow image data sent from a control unit (not shown). In this manner, an electrostatic charge image in a yellow image pattern is formed on the surface of the photoreceptor 1Y.

The electrostatic charge image is an image formed on the surface of the photoreceptor 1Y by performing charging, which is a so-called negative latent image formed in a case where the specific resistance of the portion in the photosensitive layer irradiated with the laser beam from the exposure device 3Y is decreased by the laser beam, the charged electric charge on the surface of the photoreceptor 1Y flows, and the electric charge in a portion that has not been irradiated with the laser beam remains.

The electrostatic charge image formed on the photoreceptor 1Y rotates to a predetermined development position according to the traveling of the photoreceptor 1Y. Further, the electrostatic charge image on the photoreceptor 1Y is developed and visualized at this development position as a toner image by the developing device 4Y.

For example, an electrostatic charge image developer containing at least a yellow toner and a carrier is accommodated in the developing device 4Y. The yellow toner is stirred to be frictionally charged inside the developing device 4Y, has an electric charge having the same polarity (negative polarity) as the charged electric charge on the photoreceptor 1Y, and is held on a developer roll (an example of the developer holding member). Further, as the surface of the photoreceptor 1Y passes through the developing device 4Y, the yellow toner is electrostatically attached to the statically eliminated latent image portion on the surface of the photoreceptor 1Y, and the latent image is developed by the yellow toner. The photoreceptor 1Y on which the yellow toner image is formed is continuously traveled at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner and is controlled to, for example, +10 μA by a control unit (not shown) in the first unit 10Y.

After transferring the toner image to the intermediate transfer belt 20, the photoreceptor 1Y continues to rotate and comes into contact with the cleaning blade included in the photoreceptor cleaning device 6Y. Further, the toner remaining on the photoreceptor 1Y is removed by the photoreceptor cleaning device 6Y and recovered.

The primary transfer bias applied to the primary transfer rolls 5M, 5C, 5K, and 5W of the second to fifth units 10M, 10C, 10K, and 10W is also controlled according to the first unit.

In this manner, the intermediate transfer belt 20 to which the yellow toner image is transferred by the first unit 10Y is sequentially transported through the second to fifth units 10M, 10C, 10K, and 10W and the toner images of each color are superimposed and multiple-transferred.

The intermediate transfer belt 20, to which the toner images of five colors are multiple-transferred through the first to fifth units, reaches a secondary transfer unit formed of the intermediate transfer belt 20, an opposing roll 24 in contact with the inner surface of the intermediate transfer belt, and a secondary transfer roll (an example of the secondary transfer unit) 26 disposed on the image holding surface side of the intermediate transfer belt 20. Meanwhile, recording paper (an example of the recording medium) P is supplied to a gap where the secondary transfer roll 26 is in contact with the intermediate transfer belt 20 via a supply mechanism, at a predetermined timing, and a secondary transfer bias is applied to the opposing roll 24. The transfer bias applied at this time has the same polarity (−) as the polarity (−) of the toner, and the electrostatic force from the intermediate transfer belt 20 toward the recording paper P acts on the toner image so that the toner image on the intermediate transfer belt 20 is transferred onto the recording paper P. The secondary transfer bias at this time is determined according to the resistance detected by a resistance detector (not shown) that detects the resistance of the secondary transfer unit, and the voltage is controlled.

After transferring the toner image to the recording paper P, the intermediate transfer belt 20 continues to travel and comes into contact with the cleaning blade included in the intermediate transfer member cleaning device 21. The toner remaining on the intermediate transfer belt 20 is removed by the intermediate transfer member cleaning device 21 and recovered.

The recording paper P to which the toner image is transferred is sent to a pressure welding portion (nip portion) of a pair of fixing rolls in a fixing device (an example of the fixing unit) 28, and the toner image is fixed onto the recording paper P to form the fixed image.

Examples of the recording paper P that transfers the toner image include plain paper used in electrophotographic copying machines, printers, and the like. Examples of the recording medium include an OHP sheet in addition to the recording paper P.

In order to further improve the smoothness of the image surface after the fixation, for example, it is preferable that the surface of the recording paper P is also smooth. For example, coated paper in which the surface of plain paper is coated with a resin or the like, art paper for printing, or the like is preferably used.

The recording paper P in which the fixation of the color images is completed is transported toward a discharge unit, and a series of color image forming operations is completed.

The aspect of image formation by the image forming device shown in FIG. 1 is not limited to the description above. Examples of the aspect of image formation include an aspect in which a white image is formed on one surface of the recording paper P by operating only the fifth unit 10W, the recording paper P is sent upstream in the traveling direction of the intermediate transfer belt, and a color image is formed on the white image of the recording paper P by operating the first unit 10Y to the fourth unit 10K, an aspect in which a white image is formed on one surface of the recording paper P by operating only the fifth unit 10W, the recording paper P is sent upstream in the traveling direction of the intermediate transfer belt, and a white image and a color image are formed on the white image of the recording paper P by operating the first unit 10Y to the fifth unit 10W, and an aspect in which a white image is formed on one surface of the recording paper P by operating only the fifth unit 10W, the recording paper P is sent upstream in the traveling direction of the intermediate transfer belt, a white image is superimposed on the white image of the recording paper P by operating only the fifth unit 10W again, the recording paper P is returned upstream in the traveling direction of the intermediate transfer belt, and a color image are formed on multilayers of the white images of the recording paper P by operating the first unit 10Y to the fourth unit 10K.

Process Cartridge and Toner Cartridge

The process cartridge according to the present exemplary embodiment includes a developing unit which accommodates the electrostatic charge image developer according to the present exemplary embodiment and develops the electrostatic charge image formed on the surface of the image holding member as a toner image using the electrostatic charge image developer, and is detachably attached to the image forming device.

The configuration of the process cartridge according to the present exemplary embodiment is not limited thereto, and a configuration including a developing unit and, as necessary, at least one selected from other units, such as an image holding member, a charging unit, an electrostatic charge image forming unit, or a transfer unit may be employed.

Hereinafter, an example of the process cartridge according to the present exemplary embodiment will be described, but the present invention is not limited thereto. In the description below, main parts shown in the figures will be described, but description of other parts will not be provided.

Figure 2:
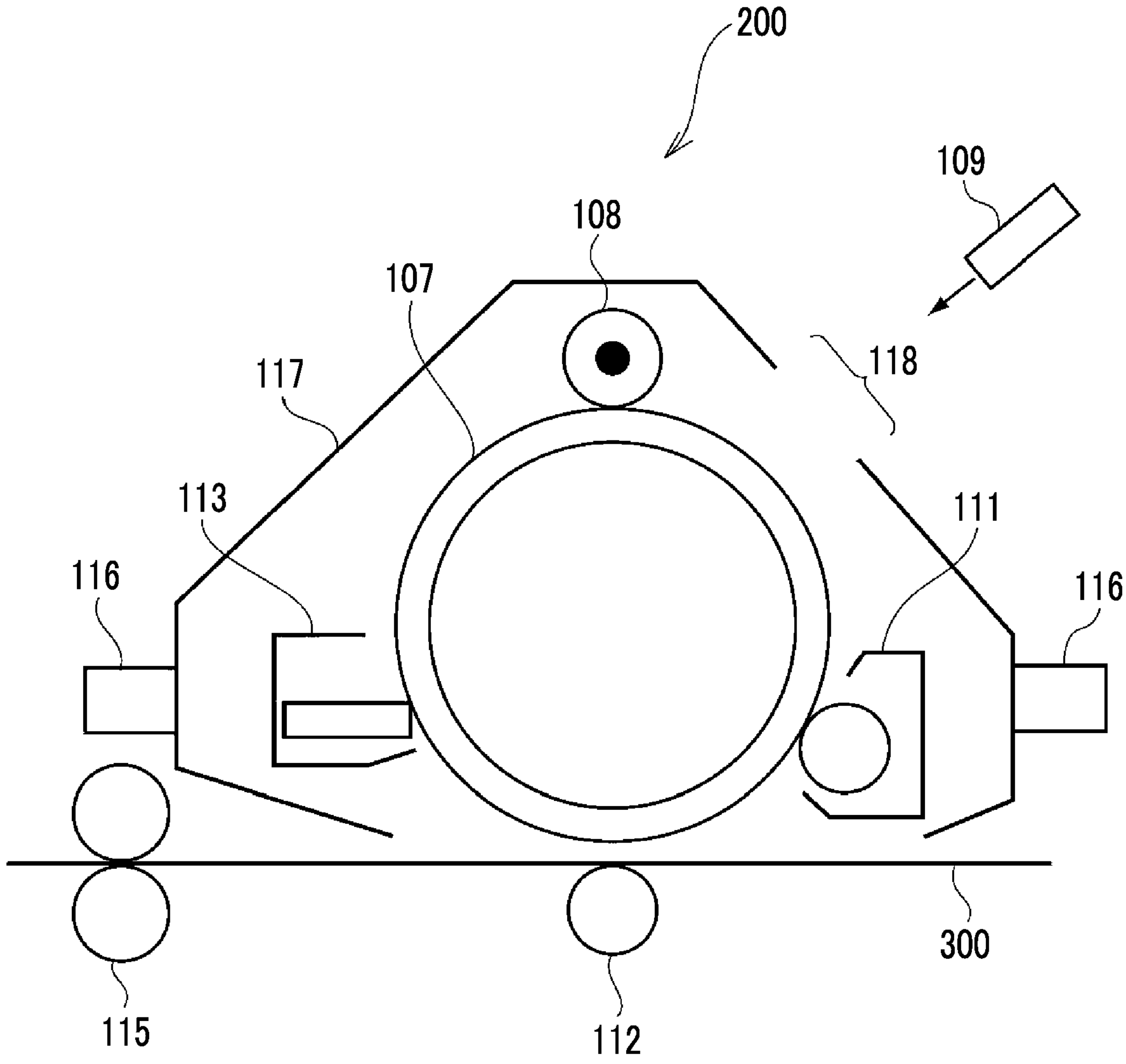
FIG. 2 is a schematic configuration view showing an example of a process cartridge detachably attached to the image forming device according to the present exemplary embodiment.

FIG. 2 is a schematic configuration view showing the process cartridge according to the present exemplary embodiment.

A process cartridge 200 shown in FIG. 2 is, for example, configured such that a photoreceptor 107 (an example of the image holding member), a charging roll 108 (an example of the charging unit) provided in the periphery of the photoreceptor 107, a developing device 111 (an example of the developing unit), and a photoreceptor cleaning device 113 (an example of the image holding member cleaning unit) are integrally combined and held by a housing 117 provided with a mounting rail 116 and an opening portion 118 for exposure to form a cartridge.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents recording paper (an example of the recording medium).

The toner cartridge according to the present exemplary embodiment will be described below.

The toner cartridge according to the present exemplary embodiment is a toner cartridge that includes a container accommodating the white toner according to the present exemplary embodiment and is detachable from the image forming device. The toner cartridge includes a container accommodating a toner for replenishment which is to be supplied to the developing unit provided in the image forming device.

The image forming device shown in FIG. 1 is an image forming device having a configuration in which the toner cartridges 8Y, 8M, 8C, 8K, and 8W are detachable, and the developing devices 4Y, 4M, 4C, 4K, and 4W are respectively connected to the toner cartridge corresponding to each color through a toner supply tube (not shown). Further, in a case where the amount of toner accommodated in the container of the toner cartridge is decreased, the toner cartridge is replaced. An example of the toner cartridge according to the present exemplary embodiment is the toner cartridge 8W, which accommodates the white toner according to the present exemplary embodiment. The toner cartridges 8Y, 8M, 8C, and 8K respectively accommodate each of yellow, magenta, cyan, and black toners.

EXAMPLES

Hereinafter, exemplary embodiments of the invention will be described in detail based on examples, but the exemplary embodiments of the invention are not limited to the examples.

In the following description, "parts" and "%" are on a mass basis unless otherwise specified.

Unless otherwise specified, synthesis, treatments, production and the like are performed at room temperature (25° C.±3° C.)

Preparation of Resin Particle Dispersion Liquid

Amorphous Polyester Resin Particle Dispersion Liquid (A)

Terephthalic acid: 70 parts

Fumaric acid: 30 parts

Ethylene glycol: 41 parts 1,5-pentanediol: 48 parts

The above-described materials are added to a reaction vessel equipped with a stirrer, a nitrogen introduction tube, a temperature sensor, and a rectifying tower, the temperature is increased to 220° C. for 1 hour in a nitrogen gas stream, and 1 part of titanium tetraethoxide is added to a total of 100 parts of the materials. The temperature is increased to 240° C. for 0.5 hours while water to be generated is distilled off, the dehydration condensation reaction is continued at a temperature of 240° for 1 hour, and the reaction product is cooled. In this manner, an amorphous polyester resin (A) having a weight-average-molecular weight of 96000 and a glass transition temperature of 61° C. is obtained.

40 parts of ethyl acetate and 25 parts of 2-butanol are added to a vessel equipped with a temperature control unit and a nitrogen substitution unit to prepare a mixed solvent, 100 parts of the amorphous polyester resin (A) is gradually added to the solvent to be dissolved therein, and a 10% ammonia aqueous solution (amount equivalent to 3 times the acid value of the resin in terms of the molar ratio) is added thereto, and the solution is stirred for 30 minutes. Next, the inside of the reaction container is substituted with dry nitrogen, the temperature is maintained at 40° C., 400 parts of ion exchange water is added dropwise thereto at a rate of 2 parts/minute while the mixed solution is stirred, and emulsification is performed. After completion of the dropwise addition, the temperature of the emulsified liquid is returned to 25° C., the solvent is removed under reduced pressure, thereby obtaining a resin particle dispersion liquid in which resin particles having a volume average particle diameter of 160 nm are dispersed. The solid content is adjusted to 20% by adding ion exchange water to the resin particle dispersion liquid, thereby obtaining an amorphous polyester resin particle dispersion liquid (A).

Crystalline Polyester Resin Particle Dispersion Liquid (C)

1,10-Decanedicarboxylic acid: 265 parts 1,6-Hexanediol: 168 parts

Dibutyl tin oxide (catalyst): 0.3 parts

The above-described materials are added to a heated and dried reaction vessel, the air in the reaction vessel is substituted with nitrogen gas to prepare an inert atmosphere, and the mixture is stirred and refluxed at 180° C. for 5 hours by mechanical stirring. Thereafter, the mixture is gradually heated to 230° C. under reduced pressure, stirred for 2 hours, and air-cooled when the mixture enters a viscous state to stop the reaction. In this manner, a crystalline polyester resin (C) having a weight-average-molecular weight of 12700 and a melting temperature of 73° C. is obtained.

90 parts of the crystalline polyester resin (C), 1.8 parts of an anionic surfactant (NEOGEN RK, manufactured by DKS Co., Ltd.), and 210 parts of ion exchange water are mixed, heated to 120° C. to be dispersed using a homogenizer (ULTRA-TURRAX T50, manufactured by IKA), and subjected to a dispersion treatment using a pressure discharge type Gaulin homogenizer for 1 hour, thereby obtaining a resin particle dispersion liquid in which resin particles having a volume average particle diameter of 160 nm are dispersed. The solid content is adjusted to 20% by adding ion exchange water to the resin particle dispersion liquid, thereby obtaining a crystalline polyester resin particle dispersion liquid (C).

Preparation of Titanium Oxide-Containing Release Agent Particle Dispersion Liquid Titanium Oxide-Containing Release Agent Particle Dispersion Liquid (1)

Ester wax (melting temperature of 82° C., manufactured by NOF Corporation): 16.0 parts Titanium oxide particles (surface-treated product, commercially available product, catalog value of particle diameter of 200 nm): 84.0 parts The above-described materials are kneaded while being heated, cooled, and solidified. The solidified kneaded product is coarsely pulverized with a cutter mill and finely pulverized with a jet mill, thereby obtaining titanium oxide-containing release agent powder.

Titanium oxide-containing release agent powder: 45 parts

Ion exchange water: 200 parts

Anionic surfactant (NEOGEN RK, manufactured by DKS Co., Ltd.): 5 parts

The above-described materials are mixed, heated to 120° C., subjected to a dispersion treatment at a dispersion pressure of 5 MPa for 120 minutes and further at 40 MPa for 360 minutes with a pressure discharge type homogenizer (Gaulin homogenizer, manufactured by Gaulin), and cooled. Ion exchange water is added thereto to adjust the solid content to 20%, thereby obtaining a titanium oxide-containing release agent particle dispersion liquid (1). The volume average particle diameter of the particles in the dispersion liquid is 1800 nm.

Titanium oxide-containing release agent particle dispersion liquids (2) to (18)

Each of titanium oxide-containing release agent particle dispersion liquids (2) to (18) is prepared in the same manner as the preparation of the titanium oxide-containing release agent particle dispersion liquid (1) except that the kind and the used amount of the release agent, the particle diameter and the used amount of the titanium oxide, and the volume average particle diameter of the particles in the dispersion liquid are changed as listed in Table 1.

TABLE 1

| Titanium oxide-containing release agent particle dispersion liquid | Release agent | | | Titanium oxide | | Volume average particle diameter of particles in dispersion liquid |
|---|---|---|---|---|---|---|
| | Type - | Melting temperature ° C. | Used amount parts by mass | Catalog value of particle diameter nm | Used amount parts by mass | nm |
| (1) | Ester wax A | 82 | 16.0 | 200 | 84.0 | 1800 |
| (2) | Ester wax A | 82 | 3.4 | 200 | 96.6 | 350 |
| (3) | Ester wax A | 82 | 20.0 | 200 | 80.0 | 2300 |
| (4) | Ester wax A | 82 | 4.0 | 200 | 96.0 | 400 |
| (5) | Ester wax A | 82 | 33.3 | 200 | 66.7 | 3200 |

TABLE 1-continued

| Titanium oxide-containing release agent particle dispersion liquid | Release agent Type - | Release agent Melting temperature ° C. | Release agent Used amount parts by mass | Titanium oxide Catalog value of particle diameter nm | Titanium oxide Used amount parts by mass | Volume average particle diameter of particles in dispersion liquid nm |
|---|---|---|---|---|---|---|
| (6) | Ester wax A | 82 | 12.3 | 200 | 87.7 | 1400 |
| (7) | Ester wax A | 82 | 10.7 | 200 | 89.3 | 1200 |
| (8) | Ester wax A | 82 | 8.4 | 200 | 91.6 | 1000 |
| (9) | Ester wax A | 82 | 17.6 | 200 | 82.4 | 2700 |
| (10) | Ester wax A | 82 | 13.8 | 300 | 86.2 | 1550 |
| (11) | Ester wax A | 82 | 6.0 | 100 | 92.4 | 800 |
| (12) | Ester wax B | 70 | 13.8 | 200 | 86.2 | 1600 |
| (13) | Ester wax A | 82 | 4.0 | 200 | 96.1 | 400 |
| (14) | Ester wax A | 82 | 4.8 | 200 | 94.5 | 500 |
| (15) | Ester wax A | 82 | 13.8 | 200 | 85.2 | 1600 |
| (16) | Ester wax A | 82 | 18.1 | 200 | 81.8 | 2000 |
| (17) | Ester wax A | 82 | 6.2 | 200 | 93.5 | 750 |
| (18) | Ester wax A | 82 | 22.0 | 300 | 78.3 | 2400 |

Preparation of Toner and Developer

Example 1

Preparation of Toner Particles

Ion exchange water: 200 parts

Amorphous polyester resin particle dispersion liquid (A) (solid content of 20%): 130 parts Crystalline polyester resin particle dispersion liquid (C) (solid content of 20%): 10 parts Titanium oxide-containing release agent particle dispersion liquid (1) (solid content of 20%): 200 parts Anionic surfactant (NEOGEN RK, manufactured by DKS Co., Ltd.): 3.0 parts The above-described materials are added to in a stirring vessel, and 0.1 N nitric acid is added thereto to adjust the pH to 3.5. An aluminum sulfate aqueous solution obtained by dissolving 2.5 parts of aluminum sulfate in 30 parts of ion exchange water is prepared and added to the stirring vessel. After a homogenizer (ULTRA-TURRAX T50, manufactured by IKA) is used for dispersion at 30° C., the solution is heated to 45° C. in a heating oil bath and maintained until the volume average particle diameter of the aggregated particles reaches 5.4 μm.

15 parts of the amorphous polyester resin particle dispersion liquid (A) (solid content of 20%) is added to a stirring vessel and maintained for 30 minutes. This operation is performed 6 times in total to obtain a dispersion liquid containing the second aggregated particles. 20 parts of a 10 mass % NTA (nitrilotriacetic acid) metal salt aqueous solution (CHELEST 70, manufactured by Chelest Corporation) is added to the dispersion liquid containing the second aggregated particles.

While the solution in the stirring vessel is continuously stirred, 0.1 parts of an anionic surfactant (NEOGEN RK, manufactured by DKS Co., Ltd.) is added thereto, and the solution is heated to 85° C. and maintained for 5 hours. Next, the solution is cooled to 30° C. at a temperature lowering rate of 0.5° C./min. Next, the solid content is separated by filtration, sufficiently cleaned with ion exchange water, and dried, thereby obtaining toner particles having a volume average particle diameter of 6.0 μm.

External Addition of Hydrophobic Silica Particles 1.5 parts of hydrophobic silica particles (RY50, manufactured by Nippon Aerosil Co., Ltd.) are added to 100 parts of the toner particles, and the mixture is mixed at 13000 rpm for 30 seconds using a sample mill. Thereafter, the mixture is sieved with a vibrating sieve having a mesh opening of 45 μm, thereby preparing an external toner.

Mixing with Carrier 10 parts of the externally added toner and 100 parts of the carrier are added a V-blender and stirred for 20 minutes. Thereafter, the mixture is sieved with a sieve having a mesh opening of 212 μm, thereby obtaining a developer. The carrier is prepared as follows.

Preparation of Carrier

Ferrite particles (volume average particle diameter of 35 μm): 100 parts

Toluene: 14 parts

Styrene/methyl methacrylate copolymer (copolymerization ratio of 15/85): 3 parts Carbon black (Rega 1330, manufactured by Cabot Corporation): 0.2 parts The above-described materials excluding ferrite particles are dispersed in a sand mill to prepare a dispersion liquid. The dispersion liquid and ferrite particles are added to a vacuum degassing type kneader, the mixture is decompressed while being stirred and is dried, thereby obtaining a resin-coated carrier.

Examples 2 to 14 and Comparative Examples 1 to 4

Toner particles, externally added toners, and developers of the examples are prepared in the same manner as in Example 1 except that the kind of the titanium oxide-containing release agent particle dispersion liquid is changed as listed in Table 2.

Performance Evaluation

Formation of White Image

A white image having a density of 100% is formed on plain paper using an electrophotographic image forming device. The toner loading amount of one layer is set to 9.0 g/m$^2$ to form a single-layer or two-layer white image.

Exposure to Ultraviolet Rays

Each image is irradiated with ultraviolet rays under conditions of a radiation illuminance of 9500 W/m$^2$ using a light source having a wavelength of 365 nm for 72 hours using an ultraviolet irradiation device (ultraviolet LED irradiator LX405S, manufactured by AS ONE Corporation).

Measurement of Whiteness

Before and after the exposure to ultraviolet rays, the L' value (brightness) of the white image is measured under a D50 light source using a spectrophotometer (X-Rite Ci62, manufactured by X-Rite, Inc.). The measured L' values are classified into A to E as follows. The results are listed in Table 3.

A: The L' value is 75 or greater.

B: The L' value is 72 or greater and less than 75.

C: The L' value is 69 or greater and less than 72.

D: The L' value is 65 or greater and less than 69.

E: The L* value is less than 65.

Evaluation of Fading Resistance

The degree of fading is acquired from the following equation and classified into A to E as follows. The results are listed in Table 3.

$$\text{Degree of fading} = (\text{initial } L^* \text{ value} - L^* \text{ value after exposure to ultraviolet rays}) / \text{initial } L^* \text{ value} \times 100$$

A: The degree of fading is less than 1.

B: The degree of fading is 1 or greater and less than 3.

C: The degree of fading is 3 or greater and less than 5.

D: The degree of fading is 5 or greater and less than 10.

E: The degree of fading is 10 or greater.

Measurement of Image Intensity

The intensity of the white image before and after exposure to ultraviolet rays is evaluated in conformity with JIS K 5600-5-4:1999 "Scratch hardness (pencil method)". As the pencil, Mitsubishi Hi-Uni Pencils (with hardnesses of 10H, 9H, 8H, 7H, 6H, 5H, 4H, 3H, 2H, H, F, HB, B, 2B, 3B, 4B, 5B, 6B, 7B, 8B, 9B, and 10B) are used. The hardest hardness without scratch on the white image is listed in Table 3.

TABLE 2

| | Titanium oxide-containing release agent particle dispersion liquid | | Release agent | Titanium oxide | | Release agent/titanium oxide Content | | | Titanium oxide in release agent domain | |
|---|---|---|---|---|---|---|---|---|---|---|
| | Type - | Used amount parts by mass | Content contained in toner particles % by mass | Content contained in toner particles % by mass | BET specific surface area $m^2/g$ | ratio contained in toner particles - | Toner particles Dt µm | Release agent domain Dw nm | Dp nm | Inclusion ratio % by number |
| Comparative Example 1 | (2) | 200 | 1.4 | 40 | 8 | 0.035 | 6.0 | 350 | 200 | 20 |
| Comparative Example 2 | (3) | 200 | 10 | 40 | 8 | 0.25 | 6.0 | 2300 | 200 | 87 |
| Comparative Example 3 | (4) | 200 | 3.2 | 40 | 8 | 0.08 | 6.0 | 400 | 200 | 23 |
| Comparative Example 4 | (5) | 200 | 20 | 40 | 8 | 0.50 | 6.0 | 3200 | 200 | 99 |
| Example 1 | (1) | 200 | 6.4 | 40 | 8 | 0.16 | 6.0 | 1800 | 200 | 82 |
| Example 2 | (6) | 200 | 5.6 | 40 | 8 | 0.14 | 6.0 | 1400 | 200 | 67 |
| Example 3 | (7) | 200 | 4.8 | 40 | 8 | 0.12 | 6.0 | 1200 | 200 | 63 |
| Example 4 | (8) | 200 | 6.4 | 70 | 8 | 0.091 | 6.0 | 1000 | 200 | 35 |
| Example 5 | (9) | 200 | 6.4 | 30 | 8 | 0.21 | 6.0 | 2000 | 200 | 90 |
| Example 6 | (10) | 200 | 6.4 | 40 | 4 | 0.16 | 6.0 | 1550 | 300 | 59 |
| Example 7 | (11) | 200 | 3.8 | 40 | 12 | 0.095 | 6.0 | 800 | 100 | 41 |
| Example 8 | (12) | 200 | 6.4 | 40 | 8 | 0.16 | 6.0 | 1600 | 200 | 76 |
| Example 9 | (13) | 200 | 1.6 | 40 | 8 | 0.04 | 4.0 | 400 | 200 | 23 |
| Example 10 | (14) | 200 | 2.8 | 40 | 8 | 0.07 | 4.0 | 500 | 200 | 29 |
| Example 11 | (15) | 200 | 6.0 | 40 | 8 | 0.15 | 4.0 | 1600 | 200 | 72 |
| Example 12 | (16) | 200 | 7.2 | 40 | 8 | 0.18 | 4.0 | 2000 | 200 | 83 |
| Example 13 | (17) | 200 | 3.4 | 40 | 8 | 0.085 | 6.0 | 750 | 200 | 43 |
| Example 14 | (18) | 200 | 14 | 40 | 4 | 0.35 | 6.0 | 2400 | 300 | 79 |

TABLE 3

| | Single-layer white image | | | | Two-layer white image | | | |
|---|---|---|---|---|---|---|---|---|
| | Original | | After exposure to ultraviolet rays | | Original | | After exposure to ultraviolet rays | |
| | Whiteness | Image intensity (Pencil hardness) | Fading resistance | Image intensity (Pencil hardness) | Whiteness | Image intensity (Pencil hardness) | Fading resistance | Image intensity (Pencil hardness) |
| Comparative Example 1 | A | 8 H | E | 2 B | A | 6 H | E | 4 B |
| Comparative Example 2 | A | 6 H | A | 3 H | A | B | A | 3 B |

TABLE 3-continued

| | Single-layer white image | | | | Two-layer white image | | | |
|---|---|---|---|---|---|---|---|---|
| | Original | | After exposure to ultraviolet rays | | Original | | After exposure to ultraviolet rays | |
| | Whiteness | Image intensity (Pencil hardness) | Fading resistance | Image intensity (Pencil hardness) | Whiteness | Image intensity (Pencil hardness) | Fading resistance | Image intensity (Pencil hardness) |
| Comparative Example 3 | A | 8 H | D | B | A | 6 H | D | 3 B |
| Comparative Example 4 | B | 5 H | B | 3 H | A | 5 H | B | 3 B |
| Example 1 | A | 7 H | A | 5 H | A | 5 H | A | 3 H |
| Example 2 | A | 7 H | A | 5 H | A | 5 H | A | 3 H |
| Example 3 | A | 8 H | B | 6 H | A | 6 H | B | 4 H |
| Example 4 | A | 5 H | A | 3 H | A | 5 H | A | H |
| Example 5 | B | 7 H | B | 5 H | B | 6 H | B | 3 H |
| Example 6 | A | 6 H | B | 4 H | A | 5 H | B | 2 H |
| Example 7 | A | 7 H | B | 3 H | A | 6 H | B | B |
| Example 8 | A | 7 H | B | H | A | 5 H | B | B |
| Example 9 | A | 8 H | B | 3 H | A | 6 H | A | H |
| Example 10 | A | 8 H | B | 4 H | A | 6 H | A | 2 H |
| Example 11 | A | 7 H | A | 5 H | A | 6 H | A | 3 H |
| Example 12 | A | 6 H | A | 4 H | A | 5 H | A | 3 H |
| Example 13 | A | 7 H | A | 3 H | A | 5 H | A | H |
| Example 14 | A | 6 H | A | 3 H | A | 6 H | A | H |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A white toner comprising:

a toner particle that contains a binder resin, a release agent, and titanium oxide, at least a part of the titanium oxide being present in a release agent domain, wherein in observation of a cross section of the toner particle, an average major axis length Dt of the toner particle, an average major axis length Dw of the release agent domain, and an average major axis length Dp of the titanium oxide in the release agent domain satisfy Expressions (1) and (2), $2\times Dp \leq Dw \leq 10\times Dp$, and     Expression (1):

$0.1\times Dt \leq Dw \leq 0.5\times Dt$     Expression (2).

2. The white toner according to claim 1, wherein in observation of the cross section of the toner particle, the average major axis length Dt of the toner particle, the average major axis length Dw of the release agent domain, and the average major axis length Dp of the titanium oxide in the release agent domain satisfy Expressions (1-1) and (2-1), $2.5\times Dp \leq Dw \leq 8\times Dp$, and     Expression (1-1):

$0.125\times Dt \leq Dw \leq 0.4\times Dt$     Expression (2-1).

3. The white toner according to claim 1, wherein in observation of the cross section of the toner particle, a number percentage of the titanium oxide in the release agent domain is 50% by number or greater with respect to an entirety of the titanium oxide contained in the toner particle.

4. The white toner according to claim 1, wherein in observation of the cross section of the toner particle, a number percentage of the titanium oxide in the release agent domain is 60% by number or greater with respect to an entirety of the titanium oxide contained in the toner particle.

5. The white toner according to claim 1, wherein a mass ratio (release agent/titanium oxide) of the release agent to the titanium oxide contained in the toner particle is 0.01 or greater and 0.3 or less.

6. The white toner according to claim 1, wherein a content of the titanium oxide contained in the toner particle is 30% by mass or greater and 70% by mass or less with respect to an entirety of the toner particle.

7. The white toner according to claim 1, wherein in observation of the cross section of the toner particle, the average major axis length Dp of the titanium oxide in the release agent domain is 100 nm or greater and 300 nm or less.

8. The white toner according to claim 1, wherein the titanium oxide contained in the toner particle has a BET specific surface area of 4 $m^2/g$ or greater and 12 $m^2/g$ or less.

9. The white toner according to claim 1, wherein the release agent includes an ester wax.

10. An electrostatic charge image developer comprising: the white toner according to claim 1.

11. A toner cartridge comprising:

a container that accommodates the white toner according to claim 1, wherein the toner cartridge is detachable from an image forming device.

* * * * *